(12) United States Patent
Lee et al.

(10) Patent No.: US 9,910,164 B2
(45) Date of Patent: Mar. 6, 2018

(54) SYMMETRICAL-TYPE MONO-SENSOR THREE-DIMENSIONAL RADIATION DETECTION AND VISUALIZATION SYSTEM AND METHOD THEREOF

(71) Applicant: Korea Atomic Energy Research Institute, Daejeon (KR)

(72) Inventors: Nam-Ho Lee, Daejeon (KR); Soon-Yong Park, Daegu (KR); Young Gwan Hwang, Daejeon (KR); Jong Yeol Kim, Gumi-si (KR); Hyun-Kyu Jung, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 254 days.

(21) Appl. No.: 14/697,198

(22) Filed: Apr. 27, 2015

(65) Prior Publication Data
US 2016/0011322 A1 Jan. 14, 2016

(30) Foreign Application Priority Data

Jul. 11, 2014 (KR) .......................... 10-2014-0087658

(51) Int. Cl.
*G01T 1/169* (2006.01)
*G06T 11/00* (2006.01)
(Continued)

(52) U.S. Cl.
CPC ............ *G01T 1/169* (2013.01); *G01T 1/1606* (2013.01); *G01T 1/2907* (2013.01); *G01T 7/00* (2013.01);
(Continued)

(58) Field of Classification Search
CPC ....... G01T 1/169; G01T 1/1606; G06T 11/00; G06T 7/0024; G06T 19/20; G06T 2219/2016; H04N 5/265; H04N 2005/2255
(Continued)

(56) References Cited

U.S. PATENT DOCUMENTS 5,204,533 A 4/1993 Simonet
6,380,541 B1 4/2002 Laine et al.
(Continued)

FOREIGN PATENT DOCUMENTS

JP 60-227186 A 11/1985
KR 10-2007-0101458 A 10/2007
(Continued)

OTHER PUBLICATIONS

European Search Report dated Nov. 16, 2015 of corresponding European Patent Application No. 15153966.5—18 pages.
(Continued)

*Primary Examiner* — Jay Au Patel
*Assistant Examiner* — Salame Amr
(74) *Attorney, Agent, or Firm* — Knobbe Martens Olson & Bear LLP (57) ABSTRACT

Disclosed is a three-dimensional radiation detection and visualization system. The three-dimensional radiation detection and visualization system includes a first sensing module including one radiation sensor, a second sensing module including one image sensor, a first supporting body in which the first sensing module and the second sensing module are coupled to one side and the other side thereof to be vertically rotated, and a second supporting body coupled with the first supporting body so that the first supporting body is vertically rotated.

13 Claims, 10 Drawing Sheets

(51) Int. Cl.
  *H04N 5/265* (2006.01)
  *G01T 1/29* (2006.01)
  *G01T 7/00* (2006.01)
  *G01T 1/16* (2006.01)
  *G06T 19/20* (2011.01)
  *G06T 7/30* (2017.01)
  *H04N 5/225* (2006.01)

(52) U.S. Cl.
  CPC ............... *G06T 7/30* (2017.01); *G06T 11/00* (2013.01); *G06T 19/20* (2013.01); *H04N 5/265* (2013.01); *G06T 2219/2016* (2013.01); *H04N 2005/2255* (2013.01)

(58) Field of Classification Search
  USPC .......................................................... 348/82
  See application file for complete search history.

(56) References Cited

U.S. PATENT DOCUMENTS

| | | | | |
|---|---|---|---|---|
| 9,116,249 | B1* | 8/2015 | Claus | .................... G01T 1/16 |
| 2005/0276448 | A1* | 12/2005 | Pryor | .................... B60K 35/00 |
| | | | | 382/103 |
| 2009/0180592 | A1* | 7/2009 | Gross | .................. A61B 6/4441 |
| | | | | 378/189 |
| 2011/0102553 | A1* | 5/2011 | Corcoran | ........... G06K 9/00281 |
| | | | | 348/50 |
| 2011/0188727 | A1* | 8/2011 | Robinson | ............... G01N 23/04 |
| | | | | 382/132 |
| 2012/0043471 | A1* | 2/2012 | Harpring | .................. G01T 7/00 |
| | | | | 250/394 |
| 2012/0091356 | A1* | 4/2012 | Oh | ........................ G01T 1/2907 |
| | | | | 250/395 |
| 2012/0212499 | A1* | 8/2012 | Haddick | ............ G02B 27/0093 |
| | | | | 345/589 |

FOREIGN PATENT DOCUMENTS

| KR | 10-2008-0095583 A | 10/2008 |
|---|---|---|
| KR | 10-2012-0097833 A | 9/2012 |
| KR | 10-1309826 B1 | 10/2013 |
| KR | 10-2013-0121828 A | 11/2013 |

OTHER PUBLICATIONS

Choi et al, "Imaging Simulation of Radiation Signal using Stereo Vision and Pan/Tilt device", The Korean Institute of Electrical Engineers, 2013, pp. 341-342.

* cited by examiner

SYMMETRICAL-TYPE MONO-SENSOR THREE-DIMENSIONAL RADIATION DETECTION AND VISUALIZATION SYSTEM AND METHOD THEREOF

CROSS-REFERENCE TO RELATED APPLICATION

This application claims priority to and the benefit of Korean Patent Application No. 10-2014-0087658, filed on Jul. 11, 2014, the disclosure of which is incorporated herein by reference in its entirety.

BACKGROUND

1. Field

The present disclosure relates to a three-dimensional radiation detection and visualization system and a method thereof, and more particularly, to a three-dimensional radiation detection and visualization system which is capable of calculating space radiation information in a three-dimensional space.

2. Discussion of Related Art

In an environment in which a radiation leakage accident, such as the Chernobyl nuclear accident or the Fukushima nuclear accident, has occurred, there are many difficulties due to radiation contamination. Various decontamination techniques are being developed to treat a radiation leakage source or a radiation contamination source, and these techniques are also needed in the decommissioning process of an aging nuclear power plant which is expected to continuously increase in future.

To decontaminate the radiation contamination source, an operation of finding the contamination source (the radiation source) is performed. Today, in developed countries, radiation imaging devices (called "gamma cameras") have been developed and sold at high prices.

SUMMARY

The present disclosure is directed to a three-dimensional radiation detection and visualization system capable of minimizing a complicated coordinate conversion process or error occurrence during the coordinate conversion process.

An aspect of the present invention provides a three-dimensional radiation detection and visualization system including a first sensing module including one radiation sensor, a second sensing module including one image sensor, a first supporting body in which the first sensing module and the second sensing module are coupled to one side and the other side thereof to be vertically rotated, and a second supporting body coupled with the first supporting body so that the first supporting body is horizontally rotated.

Another aspect of the present invention provides a three-dimensional radiation detection and visualization system using a three-dimensional radiation detection and visualization system including a first sensing module including one radiation sensor, a second sensing module including one image sensor, a first supporting body in which the first sensing module and the second sensing module are coupled to one side and the other side thereof to be vertically rotated, and a second supporting body coupled with the first supporting body so that the first supporting body is horizontally rotated, the method including a first operation of arranging the first sensing module and the second sensing module so that the radiation sensor and the image sensor are directed to a target area, a second operation in which the radiation sensor obtains first radiation information of the target area, and the image sensor obtains first image information of the target area, a third operation of vertically rotating the first sensing module and the second sensing module at an angle of 180 degrees, and horizontally rotating the first supporting body at the angle of 180 degrees, and a fourth operation in which the radiation sensor obtains second radiation information of the target area, and the image sensor obtains second image information of the target area.

Still another aspect of the invention provides an apparatus for capturing visual image data and radiation data for locating a radiation source. The apparatus may comprise: a visual image camera configured to capture visual image data of a target, the visual image camera comprising a visual image camera axis, the visual image camera configured to rotate about a rotational axis that passes the visual image camera; a radiation camera configured to capture radiation data of a target, the radiation camera comprising a radiation camera axis, the radiation camera configured to rotate about a rotational axis that passes the radiation camera; a first supporting body connected to the visual image camera and the radiation camera such that the visual image camera and the radiation camera are distanced from each other with a fixed distance between the visual image camera and the radiation camera; and a second supporting body connected to the first supporting body such that the first supporting body can rotate about a first rotational axis that passes the first supporting body, wherein the visual image camera and the radiation camera rotate about the first rotational axis when the first supporting body rotates about the first rotational axis; wherein the apparatus is programmed to capture visual image data of the target in a first setting at a first time and to further capture radiation data of the target in a second setting at a second time, wherein in the first setting, the visual image camera is at a first angular location about the first rotational axis, wherein in the second setting, the radiation camera is at the first angular location about the first rotational axis.

In the foregoing apparatus, the visual image camera axis in the first setting may be aligned with the radiation camera axis in the second setting such that the visual image data and the radiation data are captured with alignment of the visual image camera axis and the radiation camera axis even if capturing of the visual image data and capturing of the radiation data take place at different times. The apparatus does not comprise an additional visual image camera connected to the first supporting body, wherein the apparatus does not comprise an additional radiation cameral connected to the first support body.

Still in the foregoing apparatus, the visual image camera and the radiation camera may be connected to the first supporting body such that the visual image camera axis moves in a first imaginary plane perpendicular to the rotational axis passing the visual image camera when the visual image camera rotates about the first rotational axis. The visual image camera and the radiation camera may be connected to the first supporting body such that the radiation camera axis moves in a second imaginary plane perpendicular to the rotational axis passing the radiation camera when the radiation camera rotates about the first rotational axis. The visual image camera and the radiation camera may be distanced from each other such that the fixed distance is measured between the first and second imaginary planes. A distance between the first rotational axis and the first imaginary plane may be substantially the same as that between the first rotational axis and the second imaginary plane.

Further in the foregoing apparatus: the rotational axis passing the visual image camera and the rotational axis passing the radiation camera may be identical. In the first setting, the radiation camera may be at a second angular location about the first rotational axis that is 180° from the first angular location, wherein in the second setting, the visual image camera may be at the second angular location about the first rotational axis.

BRIEF DESCRIPTION OF THE DRAWINGS

The above and other aspects, features and advantages of the present invention will become more apparent to those of ordinary skill in the art by describing in detail embodiments thereof with reference to the accompanying drawings, in which.

DETAILED DESCRIPTION OF EMBODIMENTS

Embodiments of the present invention will be described in detail below with reference to the accompanying drawings, wherein like reference numerals refer to like or corresponding elements throughout the drawings and repeated description thereof will be omitted.

Further, in the following description, if it is considered that the specific description of the related and noticed functions or structures may obscure the gist of the present invention, the specific description will be omitted. Also, the accompanying drawings are used to help easily understand the technical idea of the present invention and it should be understood that the idea of the present invention is not limited by the accompanying drawings.

Generally, radiation imaging devices detect a position of the radiation source using a sensing module (a radiation sensor+an image sensor) coupled with a PMT (Photomultiplier Tube), a semiconductor sensor or a CCD camera, and overlappingly display the detected position on a real image, thereby contributing greatly to removing the radiation contamination source.

However, to extract radiation information and generate images (visualizes) from the extracted information by overlaying a radiation image on a real image (a visible light image) the radiation imaging system has one sensing module, and can provide only direction information of the radiation source, and cannot obtain distance information to the radiation source. Therefore, it is not possible to know a distance to the radiation source and an intensity of the radiation source.

To address the above, a stereo-type apparatus having two sensing modules is used to extract the distance information to the radiation source. However, since the apparatus has two sensing modules each having a radiation sensor and an image sensor, manufacturing costs would be high and the apparatus would be heavy.

Figure 1:
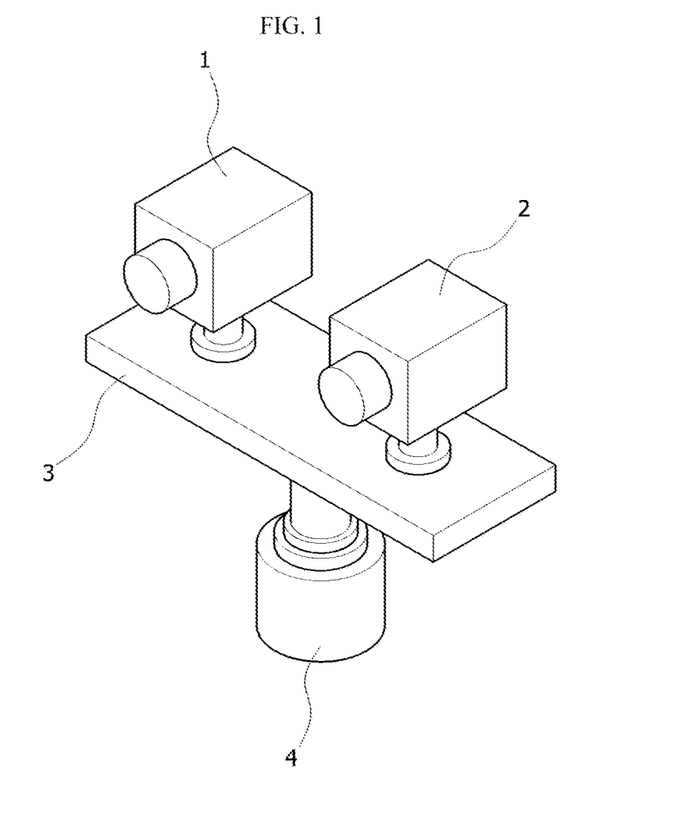
FIGS. 1 and 2 are perspective views of two different three-dimensional radiation detection and visualization systems.
Figure 2:
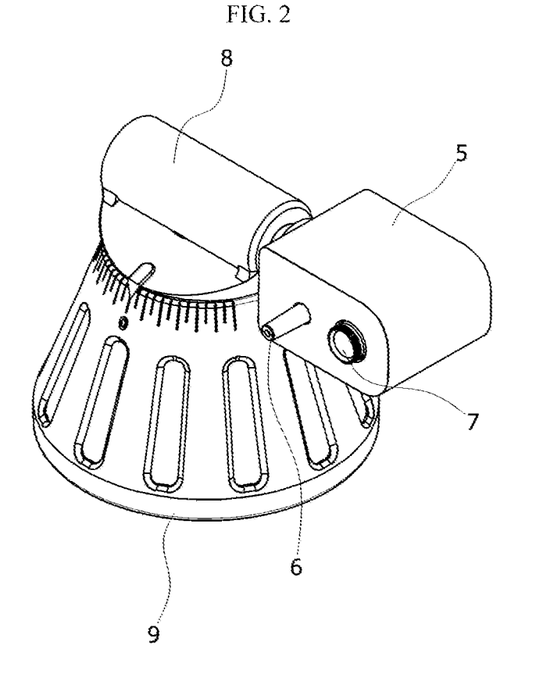

Hereinafter, one example of three-dimensional radiation detection and visualization systems will be briefly described with reference to FIGS. 1 and 2. FIGS. 1 and 2 are perspective views of two different three-dimensional radiation detection and visualization system.

The three-dimensional radiation detection and visualization system illustrated in FIG. 1 is a stereo-type three-dimensional radiation detection and visualization system in which two sensing modules 1 and 2 are applied so as to extract distance information of a radiation source. That is, two two-dimensional images having a disparity are obtained using the two sensing modules 1 and 2, three-dimensional information of a space and a radiation source is calculated from the two two-dimensional images, and thus the distance information of the radiation source may be obtained. However, each of the sensing modules 1 and 2 has an image sensor configured to obtain image information and a radiation sensor configured to obtain radiation information. Since the sensing modules 1 and 2 are formed of a heavy material for protecting the sensor from radiation, there are limitations in operability and marketability due to a heavy weight.

Thus, a stereo-type structure using one sensing module is provided. As an example thereof, there was proposed a method in which a space contaminated by radiation is scanned by one sensing module located at a left (or right) side, and the sensing module is moved to a right (or left) side, and then the space is scanned once again, and thus functions of two left and right sensing modules are realized by one sensing module. However, since an additional structure for moving the sensing module is provided, it is difficult to reduce the heavy weight of the three-dimensional radiation detection and visualization system.

Accordingly, a system as illustrated in FIG. 2 is proposed. Specifically, the system employs a method realizing a stereo radiation imaging apparatus which includes two motors and one sensing module 5. As illustrated in FIG. 2, the improved three-dimensional radiation detection and visualization system includes a base part 9, a supporting body 8 coupled to an upper end of the base part 9 to be rotated horizontally, and one sensing module 5 coupled to one side of the supporting body 8 to be rotated vertically. The sensing module 5 includes one radiation sensor 6 and one image sensor 7, and scans one of left and right spaces to obtain radiation information and image information. Then the sensing module 5 is rotated at an angle of 180 degrees to scan the other space and thus to obtain the radiation information and the image information. An image processing process with respect to each of the obtained images is performed, and three-dimensional radiation information may be finally obtained. Since the system of FIG. 2 includes one sensing module 5, the system has some advantages in aspects of a cost and a weight, compared with the system of FIG. 1. However, since the radiation sensor 6 and the image sensor 7 are arranged in parallel with each other, and thus center axes thereof do not coincide, a complicated coordinate conversion operation is performed in an image overlaying process of the radiation image and the visible light image, and thus there is a high possibility of an error occurring during a three-dimensional visualization process of the radiation information.

Figure 3:
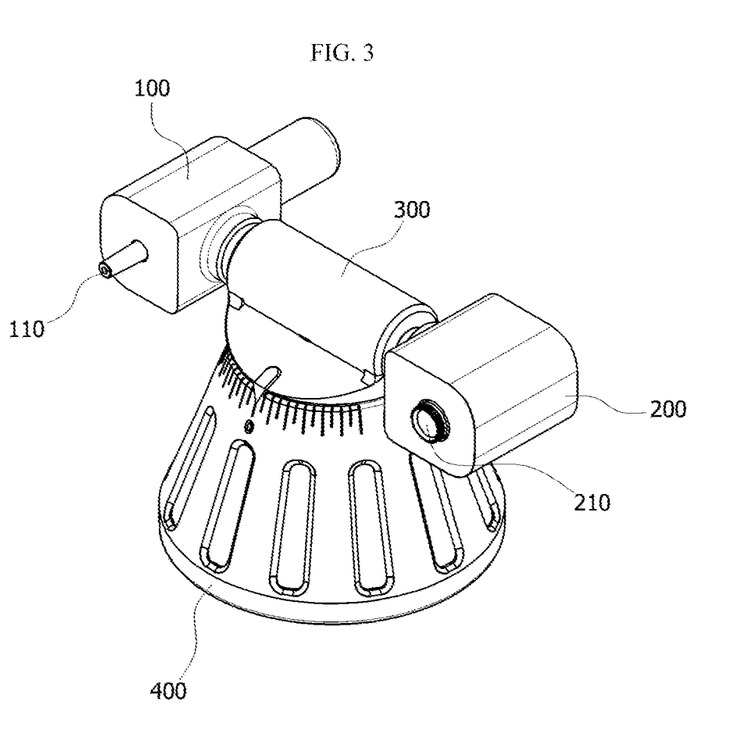
FIG. 3 is a perspective view of a three-dimensional radiation detection and visualization system according to one embodiment of the present invention.
Figure 4:
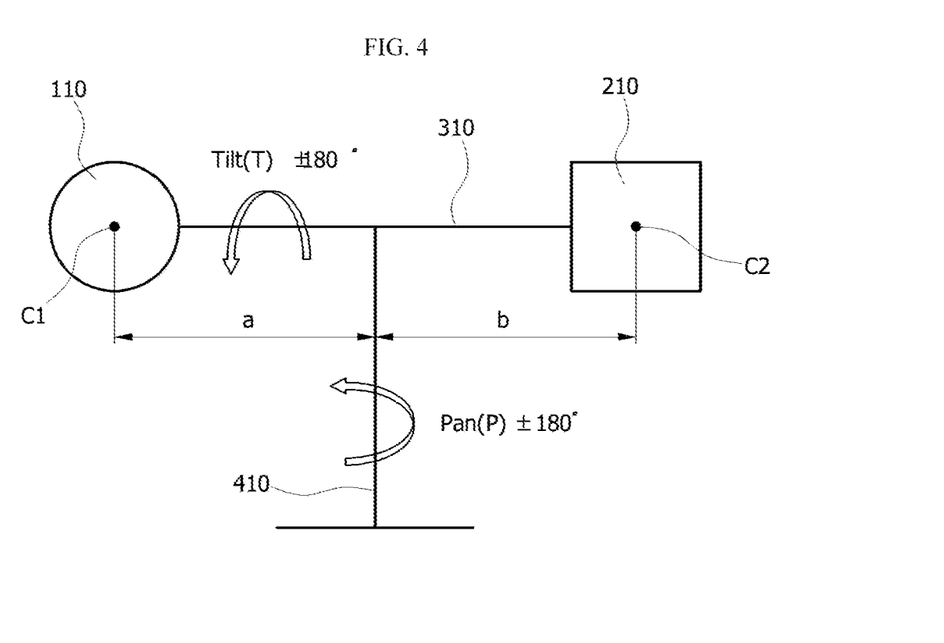
FIG. 4 is a view for explaining a rotating axis and a center axis of the three-dimensional radiation detection and visualization system according to one embodiment of the present invention.

A three-dimensional radiation detection and visualization system according to one embodiment of the present invention and a three-dimensional radiation detection and visualization method according to another embodiment of the present invention are provided to improve the stereo-type three-dimensional radiation detection and visualization system illustrated in FIGS. 1 and 2. First, the three-dimensional radiation detection and visualization system according to one embodiment of the present invention will be described with reference to FIGS. 3 and 4. FIG. 3 is a perspective view of the three-dimensional radiation detection and visualization system according to one embodiment of the present invention, and FIG. 4 is a view for explaining a rotating axis and a center axis of the three-dimensional radiation detection and visualization system according to one embodiment of the present invention.

As illustrated in FIG. 3, the three-dimensional radiation detection and visualization system according to one embodiment of the present invention includes a first sensing module 100, a second sensing module 200, a first supporting body 300 and a second supporting body 400. The first sensing module 100 includes one radiation sensor 110, the second sensing module 200 includes one image sensor 210, and a charge coupled device (CCD) or a complementary metal-oxide semiconductor (CMOS) sensor may be used as the image sensor 210. Unlike the system of FIGS. 1 and 2, the three-dimensional radiation detection and visualization system according to one embodiment of the present invention includes the two sensing modules 100 and 200, such that the first sensing module 100 includes only the radiation sensor 110 and the second sensing module 200 includes only the image sensor 210.

In embodiments, the first sensing module 100 may be a radiation detection module including only a single radiation camera that is capable of capturing radiation data of a target. The second sensing module 200 may be a visual image detection module including only a single visual image camera that is capable of capturing visual image data of a target. In one embodiment, the radiation detection module includes neither an additional radiation camera nor a visual image camera. In one embodiment, the visual image detection module includes neither a radiation camera nor an additional visual image camera.

The first supporting body 300 is a structure coupled with the first and second sensing modules 100 and 200. Specifically, the first sensing module 100 is coupled to one side of the first supporting body 300, and the second sensing module 200 is coupled to the other side of the first supporting body 300. Therefore, the radiation sensor 110 and the image sensor 210 are independently arranged at left and right sides of the first supporting body and spaced from each other. In particular, the first and second sensing modules 100 and 200 are coupled so as to be rotated vertically, i.e., to allow tilting rotation. In embodiments, the first supporting body 300 has a tilt motor (not shown) which may vertically rotate the first and second sensing modules 100 and 200. In particular, as illustrated in FIG. 4, the first and second sensing modules 100 and 200 have a common rotating axis 310 to be rotated vertically at the same speed. Therefore, in embodiments, the first and second sensing modules 100 and 200 are formed to be rotated at the same time by one tilt motor.

The second supporting body 400 is coupled with the first supporting body 300. Specifically, the second supporting body 400 is coupled so that the first supporting body 300 may be rotated horizontally. The second supporting body 400 has a pan motor which horizontally rotates the first supporting body 300, i.e., allows the first supporting body 300 to perform panning rotation. Therefore, the pan motor horizontally rotates the first supporting body 300 about a rotating axis 410 of the pan motor, and thus the first and second sensing modules 100 and 200 may be horizontally rotated at the same time. Further, the first and second sensing modules 100 and 200 may be formed to be vertically and horizontally rotated at the same time by the tilt motor and the pan motor, and thus the three-dimensional radiation detection and visualization may be performed more rapidly and effectively.

Meanwhile, first radiation information, second radiation information, first image information and second image information, which will be described later, may be obtained by the radiation sensor 110 and the image sensor 210 disposed at the first sensing module 100 and the second sensing module 200, respectively. The three-dimensional radiation detection and visualization system according to one embodiment of the present invention may further include an information processing part which dimensionalizes visible image-based radiation source detection information based on at least one of the above-mentioned types of information. The information processing part may perform at least one of functions of calculating a disparity between the first image information and the second image information; calculating a disparity between the first radiation information and the second radiation information; performing a coordinate calibration of the first radiation information, the second radiation information, the first image information and the second image information; calculating three-dimensional space image information based on the first image information and the second image information; and calculating three-dimensional space radiation information based on the first radiation information and the second radiation information. This will be described in detail later with regard to the three-dimensional radiation detection and visualization method according to another embodiment of the present invention.

Meanwhile, arrangement of the first and second sensing modules 100 and 200 will be specifically described with reference to FIG. 4. As illustrated in FIG. 4, the first and second sensing modules 100 and 200 are arranged so that a distance a between a center axis C1 of the radiation sensor 110 and the rotating axis 410 of the first supporting body 300 is the same as a distance b between a center axis C2 of the image sensor 210 and the rotating axis 410 of the first supporting body 300. In embodiments, the center axis C1 of the radiation sensor 110 and the center axis C2 of the image sensor 210 are disposed on the vertical rotating axis of the first and second sensing modules 100 and 200. As will be described later with regard to an operation of the three-dimensional radiation detection and visualization system according to one embodiment of the present invention, the center axis C1 of the radiation sensor 110 and the center axis C2 of the image sensor 210 before the first and second sensing modules 100 and 200 are rotated coincide with the center axes C1 and C2 after the first and second sensing modules 100 and 200 are rotated, and thus matched coordinates may be used when the radiation information and the visible light information are overlaid, and the accurate and simple coordinate conversion may be enabled.

Figure 5:
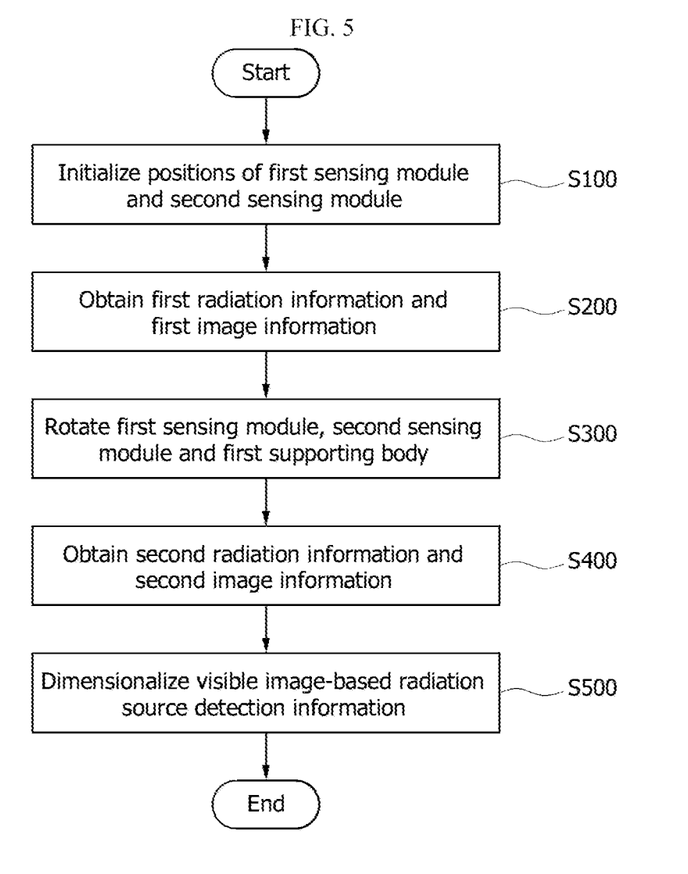
FIG. 5 is a flowchart time-sequentially illustrating a three-dimensional radiation detection and visualization method according to another embodiment of the present invention.
Figure 6:
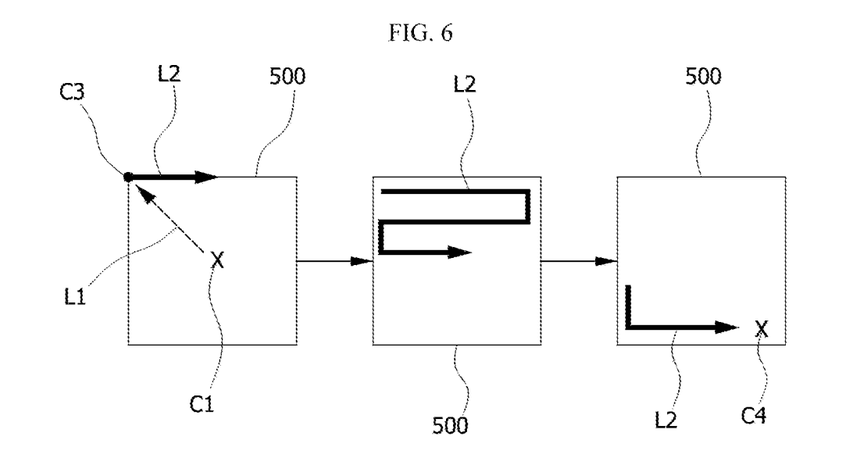
FIG. 6 is a view illustrating a method in which a radiation sensor scans a target area to obtain first radiation information in the three-dimensional radiation detection and visualization method according to another embodiment of the present invention.
Figure 7A:
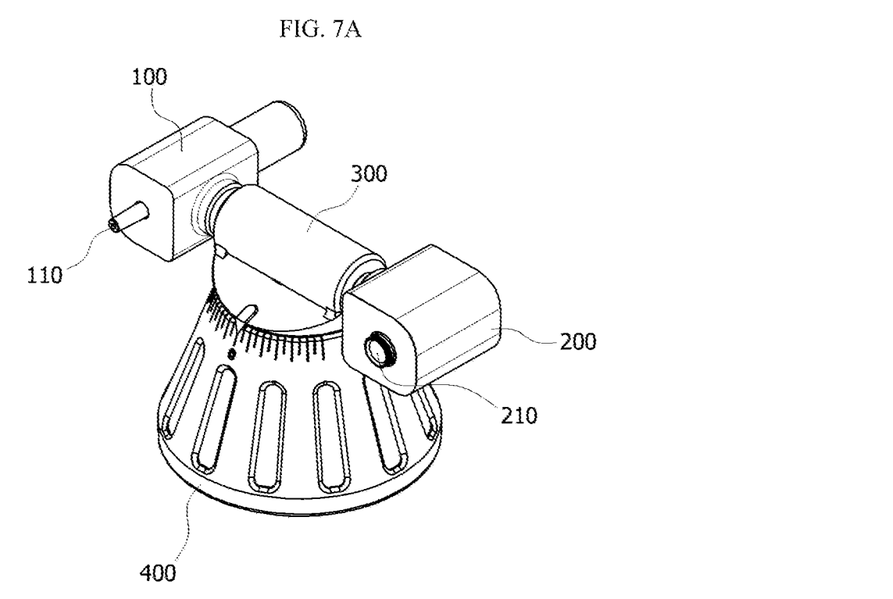
FIGS. 7A-7C are views illustrating states in which positions of a first sensing module and a second sensing module are changed by rotation of the first sensing module and the second sensing module in the three-dimensional radiation detection and visualization method according to another embodiment of the present invention.
Figure 7B:
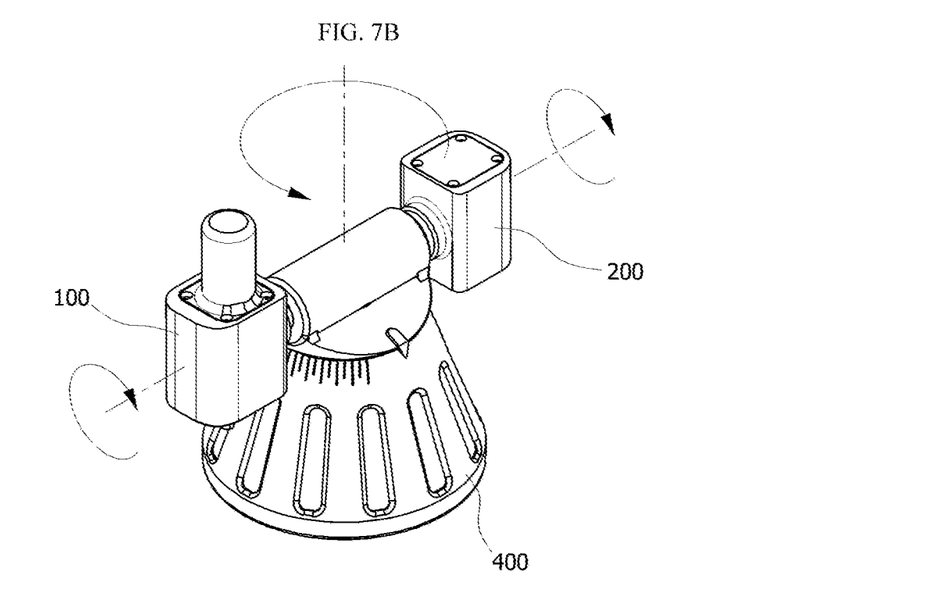
Figure 7C:
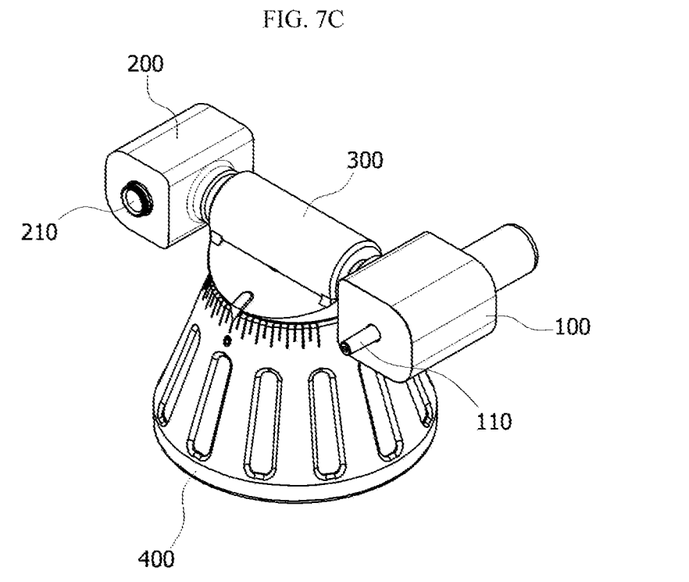
Figure 8A:
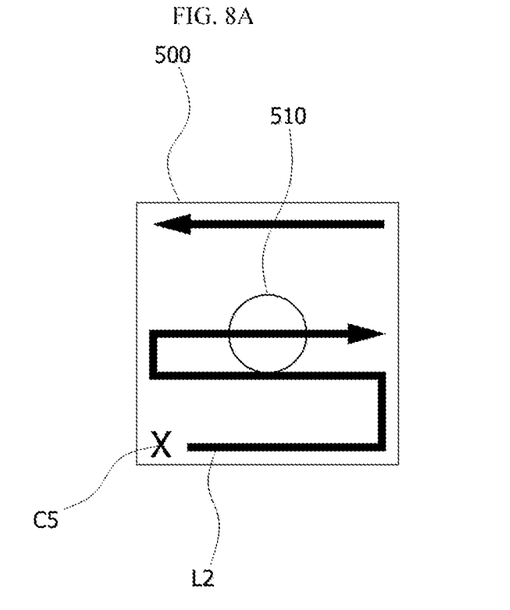
FIGS. 8A-8C are views illustrating methods in which the radiation sensor scans the target area to obtain second radiation information in the three-dimensional radiation detection and visualization method according to another embodiment of the present invention.
Figure 8B:
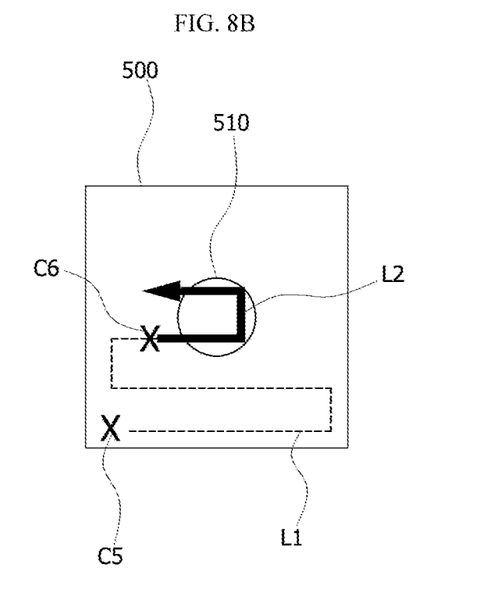
Figure 8C:
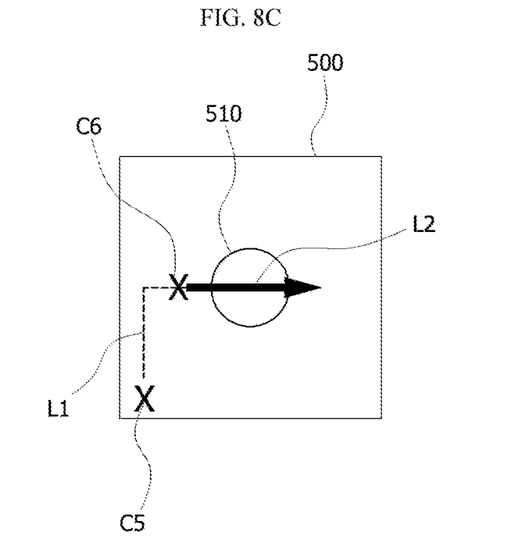
Figure 9:
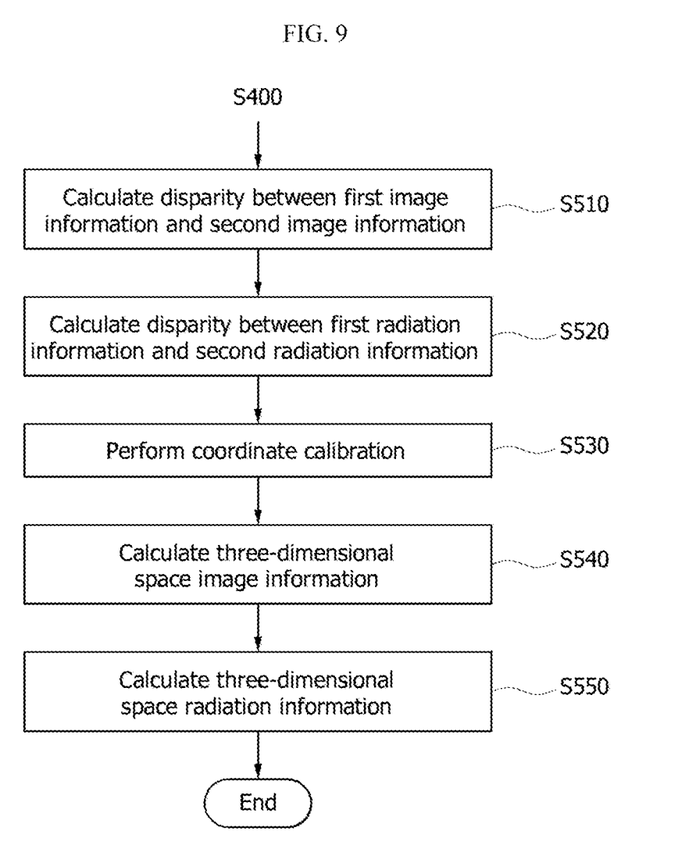
FIG. 9 is a flowchart specifically subdividing an operation of dimensionalizing radiation source detection information based on a visible image in the three-dimensional radiation detection and visualization method according to another embodiment of the present invention.

Hereinafter, the three-dimensional radiation detection and visualization method according to another embodiment of the present invention will be specifically described with reference to FIGS. 5 to 9. FIG. 5 is a flowchart time-sequentially illustrating the three-dimensional radiation detection and visualization method according to another embodiment of the present invention, FIG. 6 is a view illustrating a method in which the radiation sensor 110 scans a target area to obtain the first radiation information in the three-dimensional radiation detection and visualization method according to another embodiment of the present invention, FIGS. 7A-7C are views illustrating states in which positions of the first sensing module 100 and the second sensing module 200 are changed by rotation of the first sensing module 100 and the second sensing module 200 in the three-dimensional radiation detection and visualization method according to another embodiment of the present invention, FIGS. 8A-8C are views illustrating methods in which the radiation sensor 110 scans the target area to obtain the second radiation information in the three-dimensional radiation detection and visualization method according to another embodiment of the present invention, and FIG. 9 is a flowchart specifically subdividing an operation of dimensionalizing visible image-based radiation source detection information in the three-dimensional radiation detection and visualization method according to another embodiment of the present invention.

The three-dimensional radiation detection and visualization method according to another embodiment of the present invention is a method using the three-dimensional radiation detection and visualization system according to one embodiment of the present invention. As illustrated in FIG. 5, the three-dimensional radiation detection and visualization method according to another embodiment of the present invention includes a first operation S100 of initializing positions of the first sensing module 100 and the second sensing module 200, a second operation S200 of obtaining the first radiation information and the first image information, a third operation S300 of rotating the first sensing module 100, the second sensing module 200 and the first supporting body 300, a fourth operation S400 of obtaining the second radiation information and the second image information, and a fifth operation S500 of dimensionalizing the visible image-based radiation source detection information. Hereinafter, each operation S100 to S500 will be more specifically described.

In the first operation S100, the first sensing module 100 and the second sensing module 200 are arranged so that the radiation sensor 110 and the image sensor 210 are directed to a target area 500. In embodiments, the first sensing module 100 and the second sensing module 200 are rotated using the tilt motor and the panning motor so that the radiation sensor 110 and the image sensor 210 detect the target area 500. The next operation will be described assuming that the first sensing module 100 is arranged at the left side of the first supporting body 300, and the second sensing module 200 is arranged at the right side of the first supporting body 300 in the first operation.

In the second operation S200, first, the image sensor 210 included in the second sensing module 200 takes a picture of the target area 500 and obtains the first image information. Then, the target area 500 is scanned through the radiation sensor 110 included in the first sensing module 100, and thus the first radiation information is obtained. In particular, the radiation information of the target area 500 is obtained while the radiation sensor 110 included in the first sensing module 100 is moved up, down, left and right. Here, the target area 500 is scanned while the first sensing module is rotated up and down using the tilt motor, and the first supporting body 300 is rotated horizontally using the pan motor. At this time, an allowable rotation angle is generally set to about +/−20 degrees. An example in which the target area 500 is scanned by the radiation sensor 110 will be specifically described with reference to FIG. 6. First, the center axis C1 of the radiation sensor 110 is moved from an initial set position to a left upper end C3 of the target area 500. In embodiments, as illustrated in FIG. 6, the tilt motor and the pan motor are driven at the same time so that the center axis C1 of the radiation sensor 110 is moved from the initial set position to the left upper end C3 of the target area 500 through the shortest path L1. Then, the radiation sensor 110 starts a scanning process, and as illustrated in FIG. 6, the target area 500 is scanned along a zigzag path L2, the scanning process is finished after a right lower end C4 of the target area 500 is scanned, and thus the first radiation information is obtained.

In the third operation S300, the first sensing module 100 and the second sensing module 200 are vertically rotated at an angle of 180 degrees using the tilt motor, and the first supporting body 300 is horizontally rotated at the angle of 180 degrees using the pan motor. Specifically, when the first sensing module 100 and the second sensing module 200 are rotated at the angle of 180 degrees, the radiation sensor 110 and the image sensor 210 are directed in an opposite direction to the target area 500. In this state, when the first supporting body 300 is rotated at the angle of 180 degrees, the radiation sensor 110 and the image sensor 210 are directed to the target area 500. However, unlike the initial set position, the radiation sensor 110 and the image sensor 210 are arranged at the right side and the left side, respectively. The horizontal and vertical rotations of the first sensing module 100 and the second sensing module 200 are performed at the same time by the tilt motor and the pan motor, and thus the above-mentioned process is performed at the same time, considering a reduction in a rotating time, as illustrated in FIGS. 7A-7C. Left and right positions of the radiation sensor 110 and the image sensor 210 are changed by the 180 degree vertical and horizontal movements of the first sensing module 100 and the second sensing module 200. In this case, an imaging surface of the image sensor 210 is reversed up, down, left and right with respect to the initial set position.

In the fourth operation S400, the target area 500 is scanned through the radiation sensor 110 included in the first sensing module 100, and the second radiation information is obtained. Since the position of the radiation sensor 110 is changed from the left side of the horizontal rotating axis to the right side thereof in the third operation S300, the target area of the radiation sensor 110 in the fourth operation S400 does not coincide with that of the radiation sensor 110 in the second operation S200, but coincides with an imaging area of the image sensor 210 in the second operation S200. In particular, the radiation information of the target area 500 is obtained while the first sensing module 100 including the radiation sensor 110 is moved up, down, left and right. The description overlapping that of the second operation S200 will be omitted. In particular, in the fourth operation S400, various examples in which the target area 500 is scanned by the radiation sensor 110 will be described with reference to FIGS. 8A-8C. First, there is a scanning method in which the scanning process is started using a center point C4 after the scanning of the radiation sensor 110 in the second operation S200 as a starting point C5, and the entire target area 500 is scanned through the zigzag path L2 as illustrated in FIG. 8A. Further, there is another scanning method in which the scanning process is performed based on position of a radiation area 510 using the radiation image information extracted in the second operation S200, as illustrated in FIGS. 8B and 8C, to minimize a scanning time of the radiation sensor 110. Specifically, as illustrated in FIG. 8B, the first sensing module 100 may be moved without the scanning process using the tilt motor and the pan motor so that the center axis C1 of the radiation sensor 110 is moved to coordinates C6 adjacent to an edge of the radiation area 510 confirmed in the second operation S200, and the scanning operation may be started along the scanning path L2 of the radiation source from the coordinate C6 adjacent to the edge. In addition, when the radiation image information extracted in the second operation S200 is confirmed and it is determined that the radiation is small, the center axis C1 of the radiation sensor 110 is moved from the starting point C5 to the coordinate C6 adjacent to the radiation area 510 without the scanning process, as illustrated in FIG. 8C, and then the scanning process of the radiation area 510 is briefly performed along a line in an X-axial direction, and thus the scanning time of the radiation sensor 110 may be further reduced. Through the above-mentioned processes, the radiation sensor 110 obtains the second radiation information. Then, the center axis C1 of the radiation sensor 110 and the center axis C2 of the image sensor 210 are moved to the positions set in the first operation, the picture of the target area 500 is taken using the image sensor 210, and thus the second image information is obtained. Since the position of the image sensor 210 is changed from the right side of the horizontal axis to the left side thereof by performing the third operation S300, the imaging area of the image sensor 210 in the fourth operation S400 does not coincide with that of the image sensor 210 in the second operation S200, but coincides with the scanning area of the radiation sensor 110 in the second operation S200.

In the fifth area S500, the visible image-based radiation detection information is dimensionalized based on the first radiation information, the second radiation information, the first image information and the second image information obtained in the second and fourth operations S200 and S400. When the fifth operation is further subdivided, a 5-1th operation S510 of calculating the disparity between the first image information and the second image information is performed. At this time, as described above, since the first image information and the second image information are reversed up, down, left and right, the second image information is reversed. Then, the disparity between the first radiation information and the second radiation information is calculated. The disparities calculated in the 5-1th operation S510, and a 5-2th operation S520 are used as references for obtaining the three-dimensional image and calculating the distance of the radiation source. A 5-3th operation S530 of performing the coordinate calibration of the first image information, the second image information, the first radiation information and the second radiation information is performed, and a 5-4th operation S540 of calculating the three-dimensional space image information based on the first image information and the second image information and a 5-5th operation S550 of calculating the three-dimensional space radiation information based on the first radiation information and the second radiation information are performed. After the above-mentioned operation steps, the three-dimensional space radiation information may be overlaid on the space image information, and thus the position of the radiation source may be visualized in the three-dimensional space.

In the three-dimensional radiation detection and visualization system according to one embodiment of the present invention and the three-dimensional radiation detection and visualization method according to another embodiment of the present invention, the first sensing module including the radiation sensor and the second sensing module including the image sensor are symmetrically arranged, and the pan/tilt motors which rotate the first and second sensing module in the pan/tilt directions are provided, and thus it is possible to minimize the complicated coordinate conversion or the error occurrence during the coordinate conversion.

Also, since it is not necessary to provide two sensing modules having the radiation sensor and the image sensor, a producing cost can be reduced, and also a small size and a light weight can be achieved.

It will be apparent to those skilled in the art that various modifications can be made to the above-described embodiments of the present invention without departing from the spirit or scope of the invention. Thus, it is intended that the present invention cover all such modifications provided they come within the scope of the appended claims and their equivalents.

What is claimed is:

1. A three-dimensional radiation detection and visualization system comprising:
   a radiation detection module configured to capture radiation data of a target and comprising one radiation sensor;
   a visual image detection module configured to capture visual image data of a target and comprising one image sensor;
   a first supporting body in which the radiation detection module and the visual image detection module are coupled to one side and the other side thereof to be vertically rotated; and
   a second supporting body coupled with the first supporting body so that the first supporting body is horizontally rotatable,
   wherein, when the radiation detection module and the visual image detection module are arranged such that the radiation sensor and the image sensor are directed to a target area, the radiation sensor and the image sensor is configured to obtain first radiation information and first image information of the target area, respectively,
   wherein, subsequently when the radiation detection module and the visual image detection module are vertically rotated at an angle of 180 degrees and the first supporting body is horizontally rotated at the angle of 180 degrees, the radiation sensor and the image sensor is configured to obtain second radiation information and second image information of the target area, respectively, and
   wherein the system further comprises an information processing part configured to dimensionalize visible image-based radiation source detection information based on at least one of the first radiation information, the second radiation information, the first image information and the second image information.

2. The system of claim 1, further comprising a tilt motor configured to vertically rotate the radiation detection module and the visual image detection module; and a pan motor configured to horizontally rotate the first supporting body.

3. The system of claim 2, wherein the tilt motor is configured to rotate the radiation detection module and the visual image detection module at the same time.

4. The system of claim 2, wherein vertical rotations of the radiation detection module and the visual image detection module by the tilt motor and horizontal rotation of the first supporting body by the pan motor are performed at the same time.

5. The system of claim 1, wherein the radiation sensor is configured to obtain at least one of the first radiation information and the second radiation information by rotating the radiation detection module vertically and the first supporting body horizontally within a predetermined angular range and scanning the target area.

6. The system of claim 1, wherein the information processing part is configured to perform at least one of functions of calculating a disparity between the first image information and the second image information; calculating a disparity between the first radiation information and the second radiation information; performing a coordinate calibration of the first radiation information, the second radiation information, the first image information and the second image information; calculating three-dimensional space image information based on the first image information and the second image information; and calculating three-dimensional space radiation information based on the first radiation information and the second radiation information.

7. The system of claim 1, wherein a distance between a center axis of the radiation sensor and a rotating axis of the first supporting body is the same as a distance between a center axis of the image sensor and the rotating axis of the first supporting body.

8. A method of detecting radiation, the method comprising:
  providing a three-dimensional radiation detection and visualization system, the system comprising:
  a radiation detection module configured to capture radiation data of a target and comprising one radiation sensor;
  a visual image detection module configured to capture visual image data of a target and comprising one image sensor;
  a first supporting body in which the radiation detection module and the visual image detection module are coupled to one side and the other side thereof to be vertically rotated; and
  a second supporting body coupled with the first supporting body so that the first supporting body is horizontally rotated;
  a first operation of arranging the radiation detection module and the visual image detection module so that the radiation sensor and the image sensor are directed to a target area;
  a second operation in which the radiation sensor obtains first radiation information of the target area, and the image sensor obtains first image information of the target area;
  a third operation of vertically rotating the radiation detection module and the visual image detection module at an angle of 180 degrees, and horizontally rotating the first supporting body at the angle of 180 degrees; and
  a fourth operation in which the radiation sensor obtains second radiation information of the target area, and the image sensor obtains second image information of the target area.

9. The method of claim 8, wherein, in the second operation, the radiation sensor obtains the first radiation information by rotating the radiation detection module vertically and the first supporting body horizontally within a predetermined angular range and scanning the target area.

10. The method of claim 8, wherein, in the third operation, vertical rotations of the radiation detection module and the visual image detection module and horizontal rotation of the first supporting body are performed at the same time.

11. The method of claim 8, wherein, in the fourth operation, the radiation sensor obtains the second radiation information by rotating the radiation detection module vertically and the first supporting body horizontally within a predetermined angular range and scanning the target area.

12. The method of claim 8, further comprising a fifth operation of dimensionalizing visible image-based radiation source detection information based on the first radiation information, the second radiation information, the first image information and the second image information.

13. The method of claim 8, wherein the fifth operation comprises a 5-1th operation of calculating the disparity between the first image information and the second image information; a 5-2th operation of calculating the disparity between the first radiation information and the second radiation information; a 5-3th operation of performing a coordinate calibration of the first image information, the second image information, the first radiation information and the second radiation information; a 5-4th operation of calculating three-dimensional space image information based on the first image information and the second image information; and a 5-5th operation of calculating three-dimensional space radiation information based on the first radiation information and the second radiation information.

* * * * *